(12) United States Patent
Williamson

(10) Patent No.: US 12,416,510 B2
(45) Date of Patent: Sep. 16, 2025

(54) METHOD AND APPARATUS FOR PROVIDING AN UPDATED MAP MODEL

(71) Applicant: HERE Global B.V., Eindhoven (NL)

(72) Inventor: Dennis Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/347,764

(22) Filed: Jun. 15, 2021

(65) Prior Publication Data

US 2022/0397420 A1   Dec. 15, 2022

(51) Int. Cl.
*G01C 21/00*   (2006.01)
*G01C 21/34*   (2006.01)

(52) U.S. Cl.
CPC ..... *G01C 21/3837* (2020.08); *G01C 21/3492* (2013.01); *G01C 21/387* (2020.08)

(58) Field of Classification Search
None
See application file for complete search history.

(56) References Cited

U.S. PATENT DOCUMENTS

| 7,433,889 | B1* | 10/2008 | Barton | G08G 1/0104 |
| 10,801,845 | B2 | 10/2020 | Wheeler | |
| 2010/0110412 | A1 | 5/2010 | Basu et al. | |
| 2019/0147331 | A1* | 5/2019 | Arditi | G06N 20/00 706/20 |
| 2019/0293440 | A1* | 9/2019 | Hasemann | G06N 20/00 |
| 2019/0325349 | A1* | 10/2019 | Zhang | G06V 20/582 |
| 2020/0400452 | A1* | 12/2020 | Chintakindi | G01C 21/3694 |
| 2021/0318123 | A1* | 10/2021 | Cui | G01C 21/32 |
| 2021/0404829 | A1* | 12/2021 | St. Romain | G08G 1/096741 |
| 2022/0113159 | A1* | 4/2022 | Hou | G01C 21/3837 |

FOREIGN PATENT DOCUMENTS

| WO | WO 2020/023495 A1 | 1/2020 | |
| WO | WO-2020165650 A3 * | 9/2020 | ......... G01C 21/3492 |
| WO | WO 2020/224761 A1 | 11/2020 | |

* cited by examiner

*Primary Examiner* — Vivek D Koppikar
*Assistant Examiner* — David Ruben Pedersen
(74) *Attorney, Agent, or Firm* — ALSTON & BIRD LLP

(57) ABSTRACT

Methods described herein relate to updating a map model. Methods may include receiving data from a vehicle pertaining to a location; comparing the received data pertaining to the location to historical data pertaining to the same location; and based at least in part upon a comparison of the received data pertaining to the location and the historical data pertaining to the same location, generating an internal model for the location. A corresponding apparatus and computer program product are also provided.

20 Claims, 9 Drawing Sheets

400

RECEIVING DATA FROM A VEHICLE PERTAINING TO A LOCATION
401

COMPARING THE RECEIVED DATA TO HISTORICAL DATA PERTAINING TO THE SAME LOCATION
402

GENERATING A MODIFIED INTERNAL MODEL FOR THE LOCATION BASED AT LEAST IN PART ON THE COMPARISON
403

```
┌─────────────────────────────────────────────────────────────────────────┐
│ COMPARING THE DATA PERTAINING TO THE LOCATION DESCRIBING ONE OR MORE    │
│   ATTRIBUTES OF A LOCATION TO ONE OR MORE ATTRIBUTES OF ONE OR MORE     │
│                       PUBLISHED INTERNAL MODELS                         │
│                                   801                                   │
└─────────────────────────────────────────────────────────────────────────┘
                                     │
                                     ▼
┌─────────────────────────────────────────────────────────────────────────┐
│ SELECTING THE INTERNAL MODEL WHOSE ONE OR MORE ATTRIBUTES MOST CLOSELY  │
│   MATCH THE ONE OR MORE ATTRIBUTES OF THE DATA PERTAINING TO THE LOCATION │
│                                   802                                   │
└─────────────────────────────────────────────────────────────────────────┘
```

DETERMINING THE INTERNAL MODEL WITH THE MOST RECENT TIME STAMP
901

SELECTING THE INTERNAL MODEL ASSOCIATED WITH THE MOST RECENT TIME STAMP
902

Figure 9

METHOD AND APPARATUS FOR PROVIDING AN UPDATED MAP MODEL

TECHNOLOGICAL FIELD

Example embodiments of the present invention relate generally to a method, apparatus, and computer program product for updating a map model and, more particularly, to a method, apparatus, and computer program product for updating a map model to include a generated modified internal model pertaining to a location.

BACKGROUND

Road geometry modelling is very useful for map creation and identification of objects of interest in environments, such as road signs or other traffic indicia along a road segment. Such object identification may facilitate autonomous vehicle navigation along a prescribed path and/or visual localization of a vehicle traveling along a road segment based on scene or environment identification. Traditional methods for road geometry modelling provide only a single representation of road segments and objects pertaining to the road segments. Providing the single representation may require data collection that is resource intensive and often requires significant amounts of human measurement and calculation. Such methods are thus time consuming and costly. Exacerbating this issue is the fact that many modern-day applications require the analysis of large amounts of data, and therefore are not practical without quicker or less costly techniques.

Further complicating matters, is the dynamic nature of road environments. Road segments and objects pertaining to the road segment may be subject to change. For example, road maintenance and/or construction may change the road geometry and/or objects pertaining to the road segment.

BRIEF SUMMARY

A method, apparatus, and computer program product are provided in accordance with an example embodiment in order to update a road geometry map model. In this regard, updating a map model is based upon a comparison of received data from a vehicle and historical data pertaining to the same location. The generated modified internal model may assist in the provision of navigational instructions while the vehicle and/or operator is operating in the corresponding location pertaining to the generated modified internal model. By comparing the received data to the historical data, changes within the road segment such as road geometry and/or objects pertaining to the road segment may be detected and these changes may be incorporated into a modified internal model. The modified internal model may be reflective of the changes in a road environment and may therefore provide enhanced accuracy of the road segment and/or objects pertaining to the road segment and in at least some situations, a vehicle may be navigated in a more informed and reliable manner and associated mapping of the location may be determined with greater confidence and in a more timely manner.

In an example embodiment, a method is provided for updating a map model. The method includes receiving data from a vehicle pertaining to a location. The data describes one or more attributes of the location. The method further includes comparing the received data pertaining to the location to historical data pertaining to the same location. The historical data describes one or more attributes of the location and the historical data is used in one or more historical internal models. The method further includes generating a modified internal model for the location based at least in part upon a comparison of the received data pertaining to the location and the historical data pertaining to the same location.

In some embodiments, the modified internal model comprises one or more attributes described by the received data. In some embodiments the method further comprises increasing an associated confidence score for each attribute in the modified internal model for each instance that received data from one or more other vehicles also describes the attribute.

In some embodiments, the method further comprises causing the modified internal model to be provided to a computing device onboard the vehicle to assist in provision of one or more navigational instructions.

In some embodiments, the one or more historical internal models comprise one or more attributes described by the historical data and the one or more historical internal models are published such that the one or more published historical internal models are accessible to a computing device onboard the vehicle. In some embodiments, the method further comprises decreasing an associated confidence score for each attribute in the one or more historical internal models for each instance that received data from one or more vehicles does not depict the attribute associated with the one or more historical internal models.

In some embodiments, the method further comprises in an instance the one or more attributes associated with the one or more published historical internal models does not satisfy a confidence score threshold, unpublishing the one or more historical internal models such that the one or more historical internal models are no longer accessible to a computing device onboard the vehicle.

In some embodiments, the one or more historical internal models and the updated internal model are associated with a time stamp indicating a time associated with capture of the one or more attributes.

In another example embodiment, an apparatus is provided for updating a map model. The apparatus includes at least one processor and at least one memory including computer program code with the at least one memory and the computer program code configured to, with the at least one processor, cause the apparatus to receive data from a vehicle pertaining to a location. The data describes one or more attributes of the location. The at least one memory and the computer program code are further configured to, with the at least one processor, cause the apparatus to compare the received data pertaining to the location to historical data pertaining to the same location. The historical data describes one or more attributes of the location and the historical data is used in one or more historical internal models. The at least one memory and the computer program code are further configured to, with the at least one processor, cause the apparatus to generate a modified internal model for the location based at least in part upon a comparison of the received data pertaining to the location and the historical data pertaining to the same location.

In some embodiments, the modified internal model comprises one or more attributes described by the received data. In some embodiments the at least one memory and the computer program code are further configured to, with the at least one processor, cause the apparatus increase an associated confidence score for each attribute in the modified internal model for each instance that received data from one or more other vehicles also describes the attribute.

In some embodiments, the at least one memory and the computer program code are further configured to, with the at least one processor, cause the apparatus to cause the modified internal model to be provided to a computing device onboard the vehicle to assist in provision of one or more navigational instructions.

In some embodiments, the one or more historical internal models comprise one or more attributes described by the historical data and the one or more historical internal models are published such that the one or more published historical internal models are accessible to a computing device onboard the vehicle. In some embodiments, the at least one memory and the computer program code are further configured to, with the at least one processor, cause the apparatus to decrease an associated confidence score for each attribute in the one or more historical internal models for each instance that received data from one or more vehicles does not depict the attribute associated with the one or more historical internal models.

In some embodiments, the at least one memory and the computer program code are further configured to, with the at least one processor, cause the apparatus, in an instance the one or more attributes associated with the one or more published historical internal models does not satisfy a confidence score threshold, unpublish the one or more historical internal models such that the one or more historical internal models are no longer accessible to a computing device onboard the vehicle.

In some embodiments, the one or more historical internal models and the updated internal model are associated with a time stamp indicating a time associated with capture of the one or more attributes.

In another example embodiment, a computer program product is provided for updating a map model. The computer program product includes at least one non-transitory computer-readable storage medium having computer-executable program code portions stored therein. The computer-executable program code portions include program code instructions configured to receive data from a vehicle pertaining to a location. The data describes one or more attributes of the location. The computer-executable program code portions of an example embodiment also include program code instructions configured to compare the received data pertaining to the location to historical data pertaining to the same location. The historical data describes one or more attributes of the location and the historical data is used in one or more historical internal models. The computer-executable program code portions of an example embodiment also include program code instructions configured to generate a modified internal model for the location based at least in part upon a comparison of the received data pertaining to the location and the historical data pertaining to the same location.

In some embodiments, the modified internal model comprises one or more attributes described by the received data. In some embodiments the computer-executable program code portions of an example embodiment also include program code instructions configured to increase an associated confidence score for each attribute in the modified internal model for each instance that received data from one or more other vehicles also describes the attribute.

In some embodiments, the computer-executable program code portions of an example embodiment also include program code instructions configured to cause the modified internal model to be provided to a computing device onboard the vehicle to assist in provision of one or more navigational instructions.

In some embodiments, the one or more historical internal models comprise one or more attributes described by the historical data and the one or more historical internal models are published such that the one or more published historical internal models are accessible to a computing device onboard the vehicle. In some embodiments, the computer-executable program code portions of an example embodiment also include program code instructions configured to decrease an associated confidence score for each attribute in the one or more historical internal models for each instance that received data from one or more vehicles does not depict the attribute associated with the one or more historical internal models.

In some embodiments, the computer-executable program code portions of an example embodiment also include program code instructions configured to, in an instance the one or more attributes associated with the one or more published historical internal models does not satisfy a confidence score threshold, unpublish the one or more historical internal models such that the one or more historical internal models are no longer accessible to a computing device onboard the vehicle.

In some embodiments, the one or more historical internal models and the updated internal model are associated with a time stamp indicating a time associated with capture of the one or more attributes.

In a further example embodiment, an apparatus is provided that includes means for updating a map model. The apparatus also includes means for receiving data from a vehicle pertaining to a location. The data describes one or more attributes of the location. The apparatus also includes means for comparing the received data pertaining to the location to historical data pertaining to the same location. The historical data describes one or more attributes of the location and the historical data is used in one or more historical internal models. The apparatus also includes means for generating a modified internal model for the location based at least in part upon a comparison of the received data pertaining to the location and the historical data pertaining to the same location.

In some embodiments, the modified internal model comprises one or more attributes described by the received data. In some embodiments, the apparatus also includes means for increasing an associated confidence score for each attribute in the modified internal model for each instance that received data from one or more other vehicles also describes the attribute.

In some embodiments, the apparatus also includes means for causing the modified internal model to be provided to a computing device onboard the vehicle to assist in provision of one or more navigational instructions.

In some embodiments, the one or more historical internal models comprise one or more attributes described by the historical data and the one or more historical internal models are published such that the one or more published historical internal models are accessible to a computing device onboard the vehicle. In some embodiments, the apparatus also includes means for decreasing an associated confidence score for each attribute in the one or more historical internal models for each instance that received data from one or more vehicles does not depict the attribute associated with the one or more historical internal models.

In some embodiments, the apparatus also includes means for in an instance the one or more attributes associated with the one or more published historical internal models does not satisfy a confidence score threshold, unpublishing the one or more historical internal models such that the one or more historical internal models are no longer accessible to a computing device onboard the vehicle.

In some embodiments, the one or more historical internal models and the updated internal model are associated with a time stamp indicating a time associated with capture of the one or more attributes.

In an example embodiment, a method is provided for updating a map model. The method includes receiving a map update request from a computing entity. The method further includes triggering in response to the map update request, via an onboard computing device, a transmission of data pertaining to a location to the computing entity to be compared to historical data pertaining to the same location so as to generate a modified internal model for the location. The method further includes receiving, from the computing entity, one or more internal models for the location including the modified internal model generated by the computing device pertaining to the same location, and wherein the one or more internal models assist in provision of one or more navigational instructions.

In some embodiments, the data pertaining to the location transmitted to the computing device is collected using one or more sensors onboard a vehicle. In some embodiments, the one or more internal models satisfy a confidence score threshold.

In some embodiments, the method further includes comparing the data pertaining to the location describing one or more attributes of the location to one or more attributes of one or more internal models. The method further includes selecting the internal model whose one or more attributes most closely match the one or more attributes of the data pertaining to the location. The selected internal model assists in provision of one or more navigational instructions.

In some embodiments, the one or more historical internal models and the internal model are associated with a time stamp indicating a time associated with capture of the one or more attributes. The method may further include selecting the internal model based upon the time stamps of the one or more historical internal models and the modified internal model, wherein the selected internal model assists in provision of one or more navigational instructions.

In another example embodiment, an apparatus is provided for updating a map model. The apparatus includes at least one processor and at least one memory including computer program code with the at least one memory and the computer program code configured to, with the at least one processor, cause the apparatus to receive a map update request from a computing entity. The at least one memory and the computer program code are further configured to, with the at least one processor, cause the apparatus to trigger in response to the map update request, via an onboard computing device, a transmission of data pertaining to a location to the computing entity to be compared to historical data pertaining to the same location so as to generate a modified internal model for the location. The at least one memory and the computer program code are further configured to, with the at least one processor, cause the apparatus to receive, from the computing entity, one or more internal models for the location including the modified internal model generated by the computing device pertaining to the same location, and wherein the one or more internal models assist in provision of one or more navigational instructions.

In some embodiments, the data pertaining to the location transmitted to the computing device is collected using one or more sensors onboard a vehicle. In some embodiments, the one or more internal models satisfy a confidence score threshold.

In some embodiments, the at least one memory and the computer program code are further configured to, with the at least one processor, cause the apparatus to compare the data pertaining to the location describing one or more attributes of the location to one or more attributes of one or more internal models. The at least one memory and the computer program code are further configured to, with the at least one processor, cause the apparatus to select the internal model whose one or more attributes most closely match the one or more attributes of the data pertaining to the location. The selected internal model assists in provision of one or more navigational instructions.

In some embodiments, the one or more historical internal models and the internal model are associated with a time stamp indicating a time associated with capture of the one or more attributes. The at least one memory and the computer program code are further configured to, with the at least one processor, cause the apparatus to select the internal model based upon the time stamps of the one or more historical internal models and the modified internal model, wherein the selected internal model assists in provision of one or more navigational instructions.

In another example embodiment, a computer program product is provided for updating a map model. The computer program product includes at least one non-transitory computer-readable storage medium having computer-executable program code portions stored therein. The computer-executable program code portions include program code instructions configured to receive a map update request from a computing entity. The computer-executable program code portions of an example embodiment also include program code instructions configured to trigger in response to the map update request, via an onboard computing device, a transmission of data pertaining to a location to the computing entity to be compared to historical data pertaining to the same location so as to generate a modified internal model for the location. The computer-executable program code portions of an example embodiment also include program code instructions configured to receive, from the computing entity, one or more internal models for the location including the modified internal model generated by the computing device pertaining to the same location, and wherein the one or more internal models assist in provision of one or more navigational instructions.

In some embodiments, the data pertaining to the location transmitted to the computing device is collected using one or more sensors onboard a vehicle. In some embodiments, the one or more internal models satisfy a confidence score threshold.

In some embodiments, the computer-executable program code portions of an example embodiment also include program code instructions configured to compare the data pertaining to the location describing one or more attributes of the location to one or more attributes of one or more internal models. The computer-executable program code portions of an example embodiment also include program code instructions configured to select the internal model whose one or more attributes most closely match the one or more attributes of the data pertaining to the location. The selected internal model assists in provision of one or more navigational instructions.

In some embodiments, the one or more historical internal models and the internal model are associated with a time stamp indicating a time associated with capture of the one or more attributes. The computer-executable program code portions of an example embodiment also include program code instructions configured to select the internal model based upon the time stamps of the one or more historical internal models and the modified internal model, wherein the selected internal model assists in provision of one or more navigational instructions.

In a further example embodiment, an apparatus is provided that includes means for updating a map model. The apparatus also includes means for receiving a map update request from a computing entity. The apparatus also includes means for triggering in response to the map update request, via an onboard computing device, a transmission of data pertaining to a location to the computing entity to be compared to historical data pertaining to the same location so as to generate a modified internal model for the location. The apparatus also includes means for receiving, from the computing entity, one or more internal models for the location including the modified internal model generated by the computing device pertaining to the same location, and wherein the one or more internal models assist in provision of one or more navigational instructions.

In some embodiments, the data pertaining to the location transmitted to the computing device is collected using one or more sensors onboard a vehicle. In some embodiments, the one or more internal models satisfy a confidence score threshold.

In some embodiments, the apparatus also includes means for comparing the data pertaining to the location describing one or more attributes of the location to one or more attributes of one or more internal models. The apparatus also includes means for selecting the internal model whose one or more attributes most closely match the one or more attributes of the data pertaining to the location. The selected internal model assists in provision of one or more navigational instructions.

In some embodiments, the one or more historical internal models and the internal model are associated with a time stamp indicating a time associated with capture of the one or more attributes. The apparatus also includes means for selecting the internal model based upon the time stamps of the one or more historical internal models and the modified internal model, wherein the selected internal model assists in provision of one or more navigational instructions.

BRIEF DESCRIPTION OF THE DRAWINGS

Figure 1:
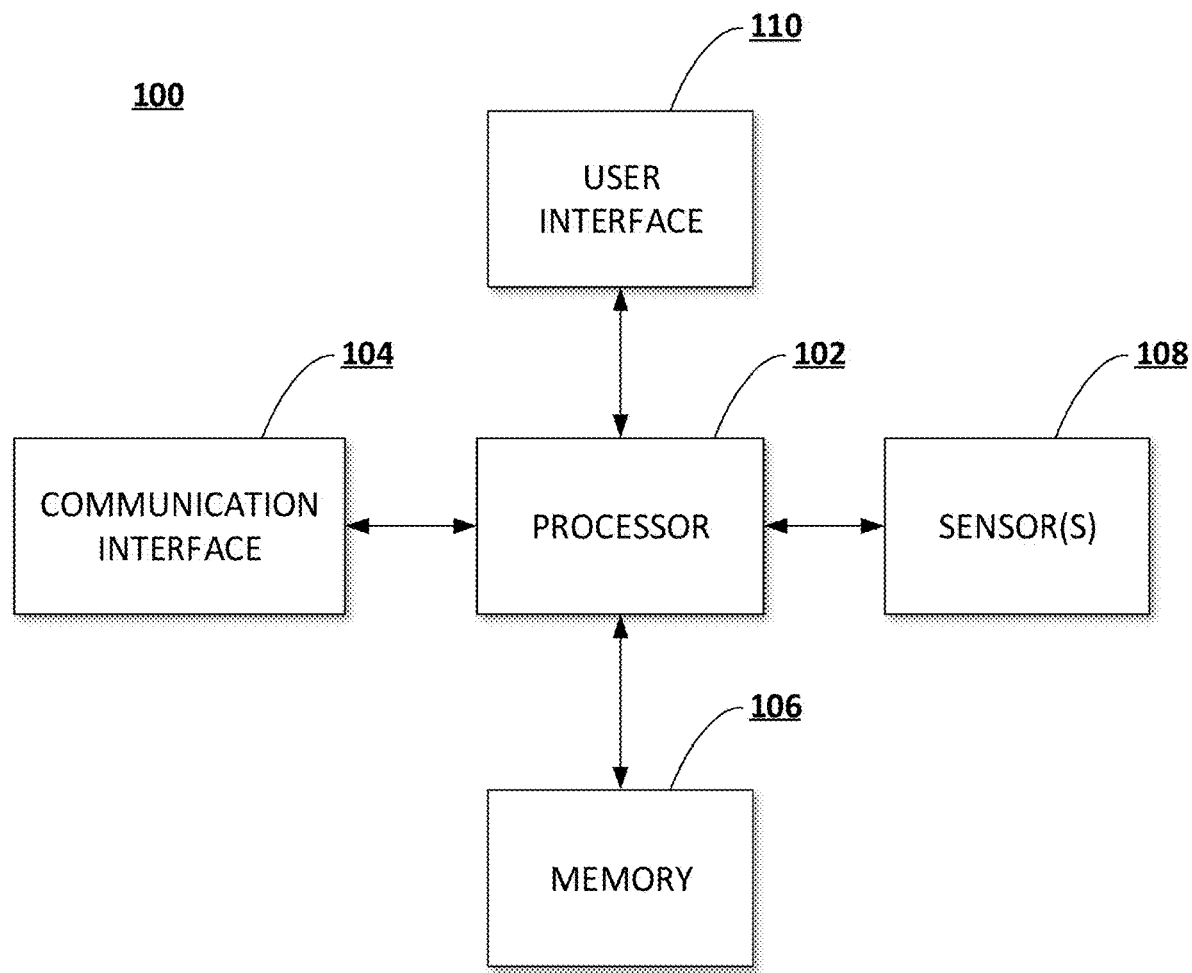
Figure 2:
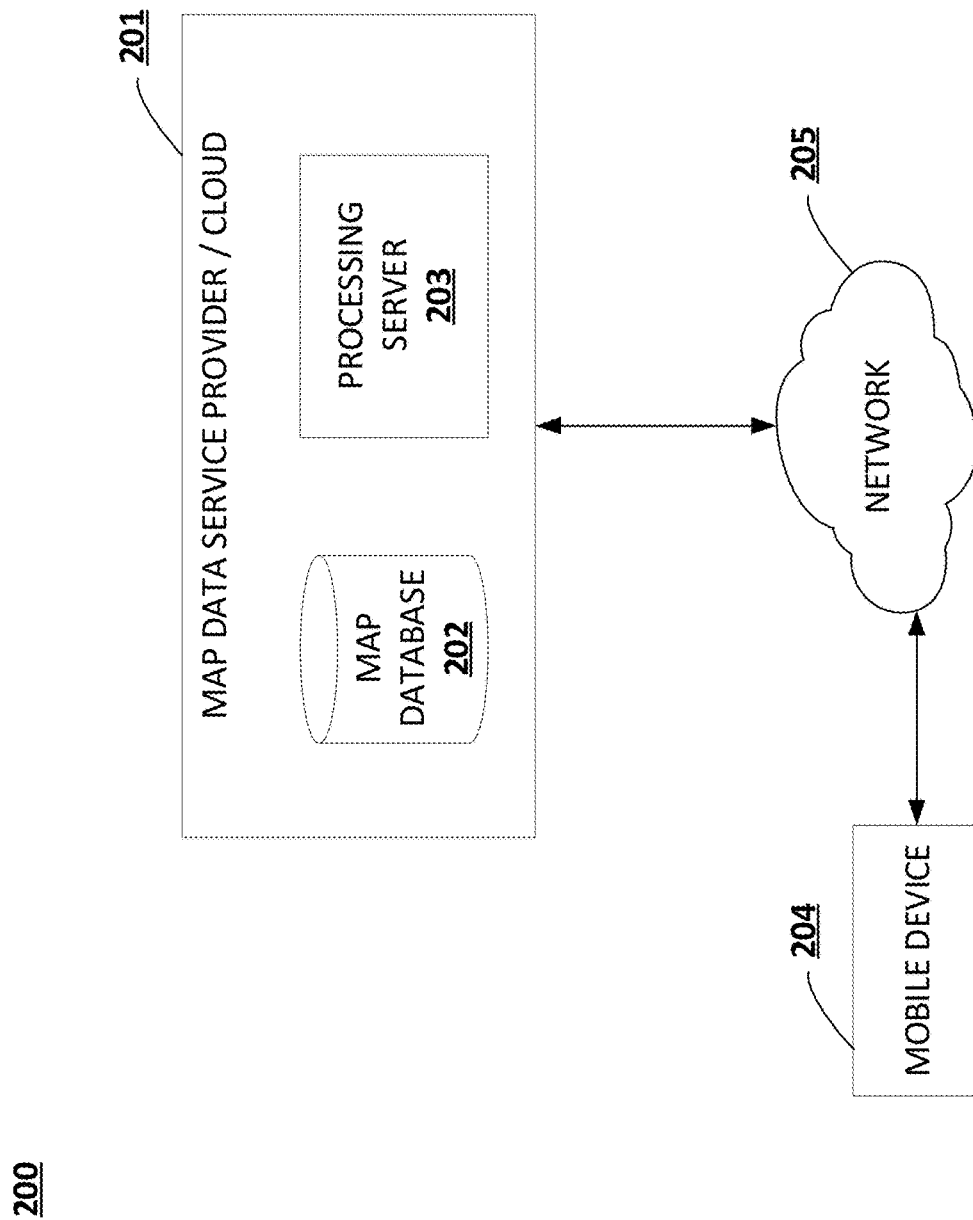
Figure 3:
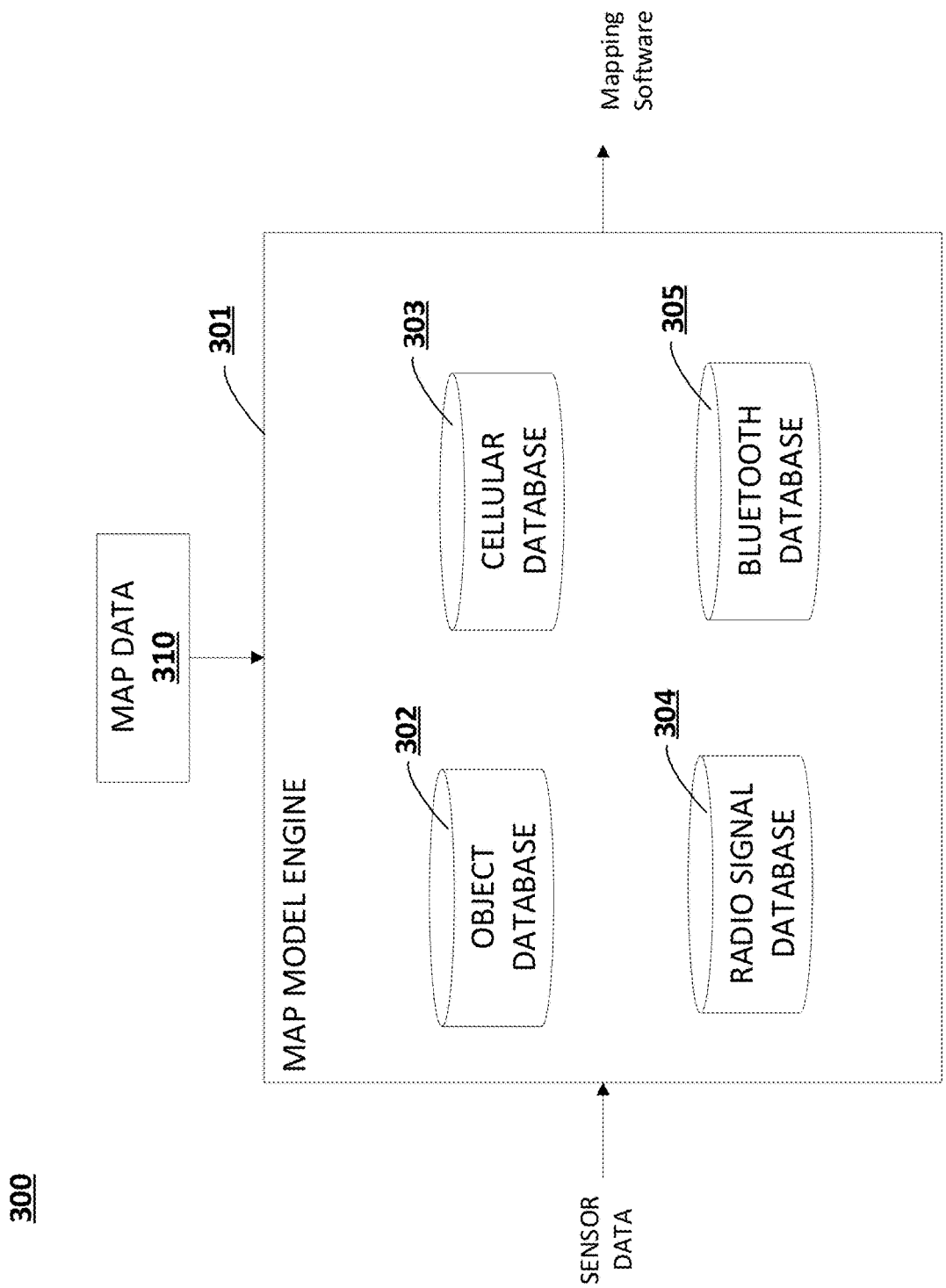
Figure 5:
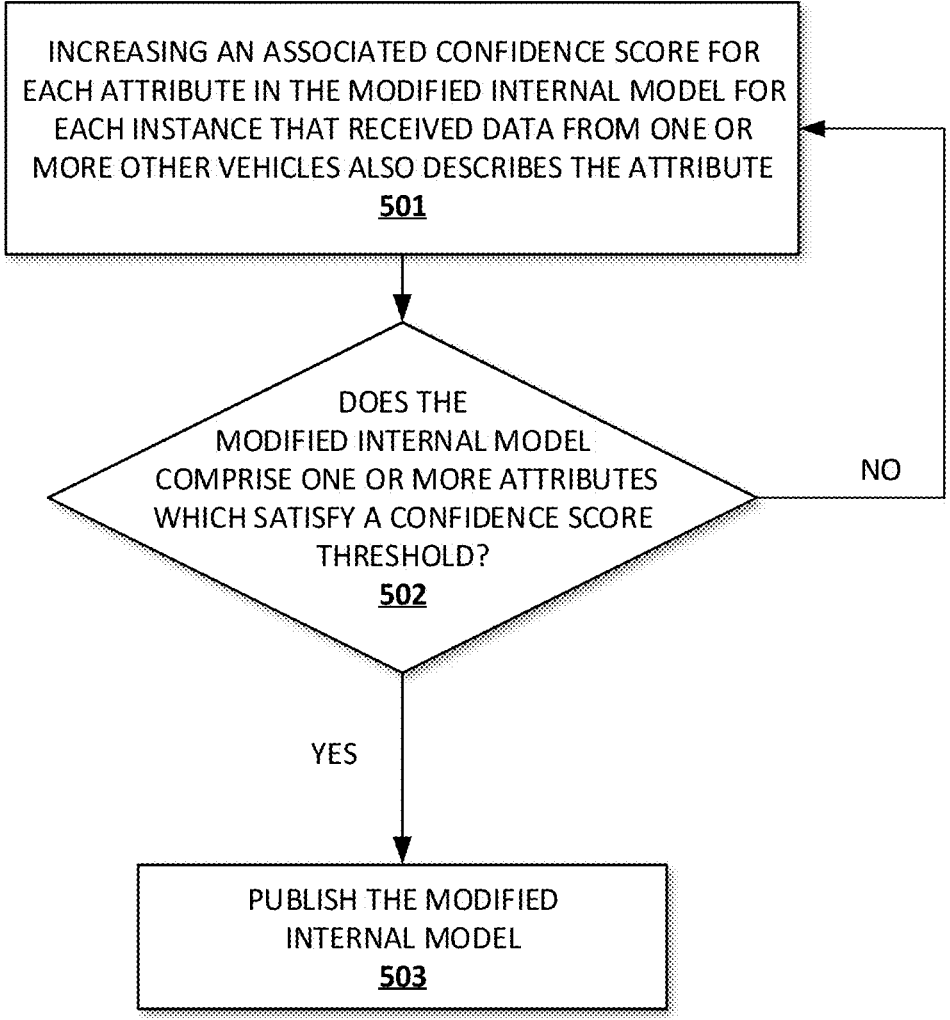
Figure 6:
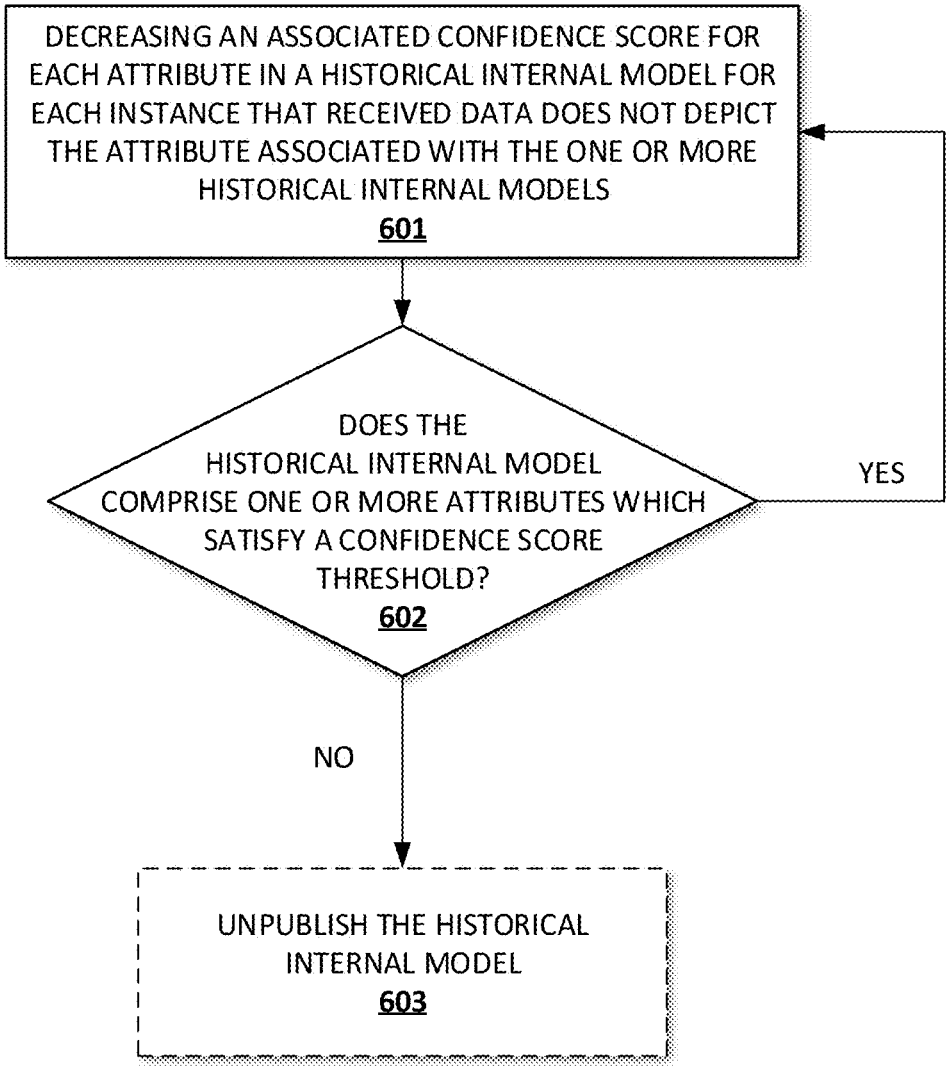
Figure 7:
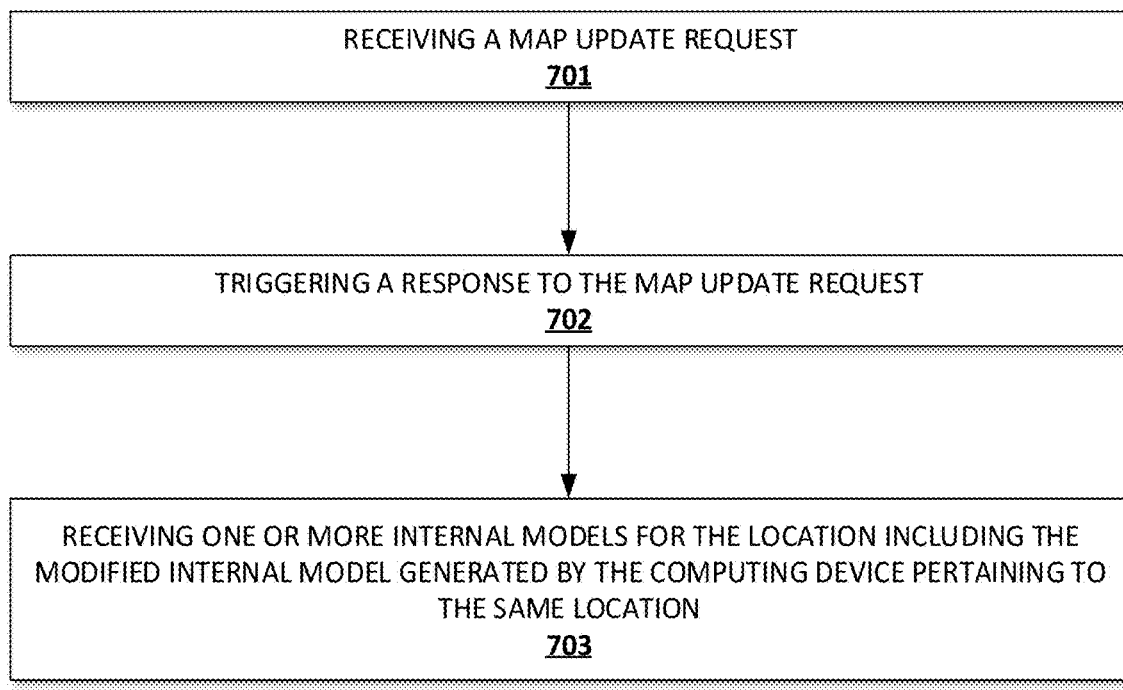

Having thus described certain embodiments of the invention in general terms, reference will now be made to the accompanying drawings, which are not necessarily drawn to scale, and where:

FIG. 1 is an apparatus that may be specifically configured in accordance with an example embodiment of the present disclosure in order to update a map model in accordance with an example embodiment of the present disclosure;

FIG. 2 is a block diagram of an overview of system that may be specifically configured to update a map model in accordance with an example embodiment of the present disclosure;

FIG. 3 is a block diagram of a system that may be specifically configured to update a map model in accordance with an example embodiment of the present disclosure;

FIG. 4 is a flow chart illustrating operations performed, such as by the apparatus of FIG. 1 embodied by a computing device, in accordance with an example embodiment of the present disclosure;

FIGS. 5-6 illustrate operations performed, such as by the apparatus of FIG. 1 embodied by a computing device, in order to update a map model in accordance with an example embodiment of the present disclosure; and FIGS. 7-9 are flow charts illustrating operations performed, such as by the apparatus of FIG. 1 embodied by a computing device of a vehicle, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Traditionally, road geometry map models have provided a single representation of road segments and/or objects pertaining to road segments along with a coarse measure of confidence, such as a quality index, to indicate the that the map is usable. The segments of the map model that satisfy the quality index may be published in the map model, such that the segments of the map model are available to operators and/or vehicles travelling that particular road segment.

However, due to the dynamic nature of road environments, maintaining an accurate map of road segments and/or objects pertaining to road segments may be difficult. For example, when a road segment is under construction, one or more lanes of the road segment may no longer be accessible and objects pertaining to the road may no longer be directly visible to vehicle sensors or to persons operating and/or navigating a vehicle. As such, vehicles operating in these areas may be unable to locate one or more expected road segment attributes as indicated by a traditional map model. Additionally, new temporary objects, such as temporary signs directing vehicles to merge lanes, may be added to provide directions to accommodate for such changes. However, these temporary new objects may not have yet been incorporated into traditional map models. As such, the quality index of such segments of a map model may decrease as a result of discrepancies that are detected between the map model and data collected by the vehicle sensors that is representative of the new objects until eventually, these affected segments of the map model are unpublished, such that these segments are no longer available to users and/or vehicles travelling that particular road segment.

This proves a significant challenge, particularly for autonomous vehicles that may rely at least in part on an accurate map model for navigation purposes. When an autonomous vehicle is travelling on a road segment that has experienced one or more changes such that the map segment of the map pertaining to the road segment is no longer accurate, the autonomous vehicle may be provided with inaccurate and/or outdated information pertaining to the road segment. When the autonomous vehicle attempts to localize itself through a localization process, a process where the vehicle attempts to match observations obtained from its one or more associated sensors to the provided data from the map model, it may be unable to do so due to outdated features of the provided map model. In instances when an autonomous vehicle is unable to localize itself, it must either stop operating autonomously or operate using the vehicle's sensors alone. Additionally, in the event the particular map segment of the map no longer satisfies the quality index, this map segment may be unpublished, thus leaving the autonomous vehicle with no guidance or information of the area and again may result in the vehicle ceasing autonomous operation or operating using the vehicle's sensors alone.

As such, it may be beneficial for the provision of one or more internal models pertaining to the same location to enhance the information provided by a map model currently employed by a vehicle and/or operator for navigational purposes while operating in the location pertaining to one or more internal models. These one or more internal models may represent road segments at different time periods, such that a vehicle and/or operators of a vehicle may be presented with one or more internal map models for the location and may choose the internal model that most closely matches the current state of the road segment. In this way, while each of the one or more internal models may not be complete, the internal models may present the vehicle and/or operator with information not previously depicted in the traditional map model and may allow the vehicle and/or operator to choose an internal model to use, such that the vehicle and/or operator is not forced to operate without a map or with an outdated map.

Further, the data collected by the sensor package of a vehicle may be selectively transmitted offboard the vehicle in a manner that conserves network bandwidth, such as by transmitting the data in an instance in which the data will serve to update an internal model or to create a new modified internal model, but not in an instance in which the data will be duplicative or otherwise not be of use. For example, a computing entity such as a map model service provider may transmit a map request update to one or more vehicles in an instance that more information is needed for a particular area and/or road segment, such as when the area is undergoing a dynamic change. In response, one or more vehicles may transmit data pertaining to the location. The computing entity, such as the map model service provider may compare the received data pertaining to the location to historical data pertaining to the same location and based upon the comparison, generate a modified internal model for the location. All internal models with sufficient confidence will be published such that the internal models may be accessible to a vehicle and/or operator and may be used to enhance a map model currently being used for navigation, for the location to which the internal model pertains. A vehicle may be able to compare one or more observations from its one or more sensors to the data provided by the one or more internal models and select an internal model that best fits the currently observed data. In this way, a vehicle, such as autonomous vehicle may be provided at least some information with sufficient confidence regarding the location such that it may avoid switching to manual operation or relying only on its one or more associated sensors.

To this end, a method, apparatus, and computer program product are provided in accordance with an example embodiment in order to update a map model. In this regard, the method, apparatus and computer program product may receive data from a vehicle pertaining to a location, wherein the data describes one or more attributes of the location and may have been collected, for example, by one or more sensors onboard the vehicle. The received data may be compared to historical data pertaining to the same location and based on the comparison, a modified internal model for the location may be generated.

FIG. 1 is a schematic diagram of an example apparatus configured for performing some of the operations described herein, particularly the processing of data to update a map model. Apparatus 100 may be embodied by or associated with any of a variety of computing devices. In some embodiments, the apparatus 100 comprises one or more computing devices, such as a central computing device, configured with mapping software to create and/or maintain high definition map data defining a road geometry and objects for a road network. In some embodiments, the apparatus 100 includes one or more computing devices, such as an onboard vehicle computing system, such as an Advanced Driver Assistance System (ADAS) module, that may be configured to identify objects on a road network, such as by using vision-based sensors according to some example embodiments described herein. However, embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus 100 may be embodied by or associated with a plurality of computing devices that are in communication with or otherwise networked with one another such that the various functions performed by the apparatus may be divided between the plurality of computing devices that operate in collaboration with one another.

In some embodiments, the apparatus 100 may be equipped with or otherwise associated with or in communication with any number of sensors 108, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in identifying an object for a particular location and/or for navigation assistance as described herein according to example embodiments. In some example embodiments, such sensors may be implemented in a vehicle or other remote apparatus, and the information detected may be transmitted to the apparatus 100, such as by near field communication (NFC) including, but not limited to, Bluetooth™ communication, or the like.

The apparatus 100 may include, be associated with, or may otherwise be in communication with a communication interface 104, processor 102, memory device 106, one or more sensors 108, and a user interface 110. In some embodiments, the processor 102 (and/or co-processors or any other processing circuitry assisting or otherwise associated with the processor) may be in communication with the memory device 106 via a bus for passing information among components of the apparatus. The memory device 106 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device 106 may be configured to store information, data, content, applications, instructions, or the like for enabling the apparatus to carry out various functions in accordance with an example embodiment of the present invention. For example, the memory device 106 could be configured to buffer input data for processing by the processor 102. Additionally or alternatively, the memory device 106 could be configured to store instructions for execution by the processor 102.

The processor 102 may be embodied in a number of different ways. For example, the processor 102 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 102 may include one or more processing cores configured to perform independently. A multi-core processor may enable multiprocessing within a single physical package. Additionally or alternatively, the processor 102 may include one or more processors configured in tandem via the bus to enable independent execution of instructions, pipelining and/or multithreading.

In an example embodiment, the processor 102 may be configured to execute instructions stored in the memory device 106 or otherwise accessible to the processor 102. Alternatively or additionally, the processor 102 may be configured to execute hard coded functionality. As such, whether configured by hardware or software methods, or by a combination thereof, the processor 102 may represent an entity (for example, physically embodied in circuitry) capable of performing operations according to an embodiment of the present invention while configured accordingly. Thus, for example, when the processor 102 is embodied as an ASIC, FPGA or the like, the processor may be specifically configured hardware for conducting the operations described herein. Alternatively, as another example, when the processor 102 is embodied as an executor of software instructions, the instructions may specifically configure the processor to perform the algorithms and/or operations described herein when the instructions are executed. However, in some cases, the processor 102 may be a processor of a specific device (for example, the computing device) configured to employ an embodiment of the present invention by further configuration of the processor by instructions for performing the algorithms and/or operations described herein. The processor 102 may include, among other things, a clock, an arithmetic logic unit (ALU) and logic gates configured to support operation of the processor.

The apparatus 100 of an example embodiment may also include or otherwise be in communication with a user interface 110. The user interface may include a touch screen display, a speaker, physical buttons, and/or other input/output mechanisms. In an example embodiment, the processor 102 may comprise user interface circuitry configured to control at least some functions of one or more input/output mechanisms. The processor 102 and/or user interface circuitry 110 comprising the processor 102 may be configured to control one or more functions of one or more input/output mechanisms through computer program instructions (for example, software and/or firmware) stored on a memory accessible to the processor (for example, memory device 106, and/or the like).

The apparatus 100 of an example embodiment may also optionally include a communication interface 104 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 104 may be configured to communicate over Global System for Mobile Communications (GSM), such as but not limited to Long Term Evolution (LTE). In this regard, the communication interface 104 may include, for example, an antenna (or multiple antennas) and supporting hardware and/or software for enabling communications with a wireless communication network. Additionally or alternatively, the communication interface 104 may include the circuitry for interacting with the antenna(s) to cause transmission of signals via the antenna(s) or to handle receipt of signals received via the antenna(s). In some environments, the communication interface 104 may optionally support wired communication may alternatively support vehicle to vehicle or vehicle to infrastructure wireless links.

In some embodiments, the apparatus 100 may support a mapping or navigation application so as to present maps or otherwise provide navigation, driver assistance, or some degree of autonomous control of a vehicle. For example, the apparatus 100 may provide for display of a map and/or instructions for following a route within a network of roads via user interface 110. In order to support a mapping application, the computing device may include or otherwise be in communication with a geographic database, which may be a map of a vision-based mapping system, such as may be stored in memory 106. For example, the geographic database includes node data records, road segment or link data records, road segment objects, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a vision-based mapping system, the map stored in memory 106 may include a databased of geo-referenced images used to identify the location of a vehicle through vision-based mapping techniques. In an example in which the apparatus 100 is embodied by a vehicle, the memory 106 may store a portion of a vision-based map database including only portions of the database that are within a predetermined geographic region relative to the vehicle such that latency may be minimized when establishing a location through analysis of the geo-referenced images.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location and the rules described by objects pertaining to said location is critical to navigation assistance and autonomous or semi-autonomous vehicle control.

Autonomous vehicles or vehicles with some level of autonomous controls provide some degree of vehicle control that was previously performed by a person driving a vehicle. Autonomous and semi-autonomous vehicle control may be performed in a variety of different ways. However, an understanding of the road geometry of the road segment and/or one or more objects pertaining to the road segment is critical when using any form of map-based vehicle control. While some degree of autonomy can be provided through visual identification of objects along a road by a vehicle traveling along the road, vehicle sensors may not provide completely accurate identifications of road segment attributes or may not sense all attributes pertaining to the road segment, which may result in inaccurate operation of the vehicle. Therefore, the provision of one or more internal maps pertaining to a location may be beneficial. For example, to assist in the localization process of a vehicle, an accurate representation of the road segment and/or object pertaining to the road segment may be necessary. The one or more internal models assist with said localization process and each internal model may be stored in the map database, such as in a High Definition (HD) map database. In some embodiments, only published internal models which satisfy a confidence score threshold are accessible and/or provided to vehicles and/or operators of vehicles.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network as depicted by objects. Further, HD maps may receive updates periodically from map service providers which may be informed by vehicles traveling along the road segments with sensor packages able to identify and update the HD maps. Embodiments described herein may facilitate the building and updating of maps, including HD maps, through the creation and updating of a map environment based on sensors or an apparatus producing sensed data. Embodiments may create a visual map of an environment and/or a three dimensional model of an environment for inclusion in an HD map. In some embodiments, a portion of an HD map may have one or more associated internal models pertaining to a location, which may provide for differing road geometry, lane geometry, road segment restrictions (e.g., speed limits), lane restrictions (e.g., turn-only lanes), and any other information as compared to other internal models pertaining to the same location.

A map service provider database may be used to provide driver assistance via a navigation system and/or through an ADAS having autonomous or semi-autonomous vehicle control features. In some embodiments, the map service provider database may utilize mapping software to generate and/or update HD maps. FIG. 2 illustrates a communication diagram of an example embodiment of a system for implementing example embodiments described herein. The illustrated embodiment of FIG. 2 includes a mobile device 204, which may be, for example, the apparatus 100 of FIG. 1, such as a mobile phone, an in-vehicle navigation system, an ADAS, or the like, and a map data service provider or cloud service 201 which may be, for example, the apparatus 100 of FIG. 1. Each of the mobile device 204 and map data service provider 201 may be in communication with at least one of the other elements illustrated in FIG. 2 via a network 205, which may be any form of wireless or partially wireless network as will be described further below. Additional, different, or fewer components may be provided. For example, many mobile devices 204 may connect with the network 205. The map data service provider 208 may be cloud-based services and/or may operate via a hosting server that receives, processes, and provides data to other elements of the system.

The map data service provider 201 may include a map database 202 that may include node data, road segment data or link data, point of interest (POI) data, traffic data, georeferenced image data for vision-based locating, or the like. The map database 202 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 202 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 202 can include data about the POIs and their respective locations in the POI records. The map database 202 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 202 can include event data (e.g., traffic incidents, construction activities, scheduled events, unscheduled events, etc.) associated with the POI data records or other records of the map database 110.

The map data service provider 201 may include a computing device configured to execute mapping software which, in turn, is configured to generate and/or maintain HD maps. The map database 202 may be maintained by a content provider e.g., the map data service provider and may be accessed, for example, by the content or service provider processing server 203. By way of example, the map data service provider 201 can collect geographic data and dynamic data to generate and enhance the map database 202 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 202, such as by the use of mapping software.

The map database 202 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems. However, while embodiments of the present disclosure may be described in the context of HD maps, other map types may be equally applicable and contemplated.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 201 map database 202 may be a master geographic database, but in alternate embodiments, a client side map database may represent a compiled navigation database that may be used in or with end user devices (e.g., mobile device 204) to provide navigation and/or map-related functions. For example, the map database 202 may be used with the mobile device 204 to provide an end user with navigation features and/or to facilitate autonomous or partial autonomous control of a vehicle. In such a case, the map database 202 can be downloaded or stored on the end user device which can access the map database 110 through a wireless or wired connection, such as via a processing server 203 and/or the network 205, for example.

As described above, the map database 202 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the objects of road segments including the position of signs along the road segment and the information contained on the signs. This data may be crowd sourced by map data service providers 201 to build more robust and reliable maps with a greater level of detail than previously available. Further, beyond building the maps in the map database 202, sensor data may be used to update map data or confirm existing map data to ensure the map database 202 is maintained and as up-to-date as possible.

Autonomous and semi-autonomous vehicles may leverage sensor information relating to roads, objects, and features proximate to road segments to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed and classified objects, such as signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

In order to use the crowd-sourced data to update a map database, sensor data may include one or more attributes sensed on a road segment. The one or more attributes pertaining to a road segment may assist mapping software, such as map data service provider 201 with accurately updating a map model. Embodiments described herein provide a technique to generate internal map models that may use the one or more sensed attributes, thereby allowing mapping models rendered by a mapping software to be more accurate.

FIG. 3 depicts a system 300 configured to update a map model. As shown, the system of this example embodiment includes a map model engine 301. The map model engine 301 may be onboard and embodied by a computing device carried by a vehicle, such as an autonomous vehicle. For example, the map model engine 301 may be embodied by an engine control module (ECM) of an autonomous vehicle. Alternatively, the map model engine 301 may be offboard, but in communication with the autonomous vehicle, such as in instances in which an edge computing device embodies the map model engine 301.

The map model engine 301 receives information captured by one or more onboard sensors. This information may include GPS or other navigation satellite system data captured by a GNSS or other satellite receiver onboard the vehicle. Additionally, or alternatively, the information received by the map model engine 301 may include cellular, Wi-Fi, Bluetooth or other radio signals received by a radio frequency (RF) receiver onboard the vehicle. Still further, the information received by the map model engine 301 may additionally or alternatively include one or more images captured by one or more image capture devices, such as one or more cameras, onboard the vehicle and/or information regarding a road segment, such as road segment geometry and/or one or more object pertaining to the road segment, so as to assist in vehicle localization.

As indicated by the types of information provided to the map model engine 301, one or more vehicles may comprise one or more different sensor types. For example, a vehicle may include a GNSS or other satellite receiver for receiving GPS, GLONASS, Galileo, BeiDou, Compass or other navigation satellite signals. Additionally, or alternatively, a vehicle may include a radio frequency (RF) receiver configured to receive cellular signals, Wi-Fi signals, Bluetooth signals or other radio signals. Still further, a vehicle may include one or more image capture devices, such as cameras, including cameras for capturing still images and/or video recording devices for capturing video images. In this regard, the image capture devices may have fields of view that extend in various directions relative to the vehicle. For example, image capture devices carried by a vehicle may include a front camera having a field of view that extends forward and to the sides of the vehicle and a rear camera having a field of view that extends rearward and to the sides of the vehicles. A vehicle may also carry additional cameras having different fields of view, such as fields of view to the opposed sides of the vehicle.

As also shown in FIG. 3, the system 300 for updating a map model also includes a source 310 of map data, such as HD map data defining road segment geometry for a road network. The map model engine 301 of this example embodiment may also include one or more databases including an object database 302. The object database 302 may identify each of a plurality of objects throughout the road network and identify the location of each of the respective objects. The object database may also include information describing the type of object, the appearance of the object or other indicia associated with the object and from which a respective object may be identified. In some embodiments, map model engine 301 also includes a cellular database 303 and/or a radio signal database 304. The cellular database 303 may provide information regarding cellular signals that are expected to be received at different locations throughout the road network, while the radio signal database 304 provides information regarding radio signals that are expected to be received at different locations throughout the road network and may include information, for example, with respect to Wi-Fi signals, such as Wi-Fi beacon locations. Additionally, or alternatively, the map model engine 301 may include a Bluetooth database 305 identifying the Bluetooth signals that are expected to be received at different locations throughout the road network, such as the location of each of a plurality of Bluetooth transmitters or beacons. Although illustrated so as to include the various databases, the map model engine 301 need not include any one or more of the databases and may, instead, be in communication with one or more external databases.

As further shown in FIG. 3, the system 300 for updating a map model may also be configured to communicate with the computing device configured to execute mapping software, such as map data service provider 201 as depicted and described in FIG. 2. In this regard, the mapping software may be provided with data describing one or more attributes of a location.

Referring now to FIG. 4, the operations are illustrated that are performed, such as by the apparatus 100 of FIG. 1 embodied by a computing device, such as map data service provider 201, in accordance with an example embodiment in order to update a map model.

Referring now to block 401 of FIG. 4, the apparatus 100 embodied by a computing device, such as map data service provider 201 include means, such as the processor 102, the communication interface 104 or the like, for receiving data from a vehicle pertaining to a location. In some embodiments, the data describes one or more attributes of the location. For example, the one or more attributes may describe the road segment, such as the road segment geometry and/or objects pertaining to the road segment such as road signs, directional arrows, traffic lights, or the like. In some embodiments, the received data may also be associated with a time stamp, such that the map data service provider 201 is aware of the time the data was obtained and/or collected.

In some embodiments, map data service provider 201 may receive the data from the vehicle in response to transmitting a map update request. In some embodiments, map data service provider 201 may request sensor data pertaining to a particular location from one or more vehicles. In some embodiments, the map update request may further request specific sensor data. For example, the map update request may specify a request for the road signs on a particular road segment. In some embodiments, the map update request may be generic such that any sensor data from the one or more vehicles traveling within the location is requested.

As shown in block 402 of FIG. 4, the apparatus 100 embodied by a computing device, such as map data service provider 201 may include means, such as the processor 102, memory 106 or the like, for comparing the received data to historical data pertaining to the same location. In some embodiments, the historical data describes one or more attributes of the location and is associated with one or more time stamps. In some embodiments, the one or more attributes described by the historical data may be outdated. For example, the one or more attributes may describe the road segment geometry and/or objects pertaining to the road segment such as road signs, directional arrows, traffic lights, or the like, which are no longer present and/or visible in the current road segment geometry. In some embodiments, the historical data is used in one or more published historical internal models. As such, the computing device, such as the processor, of an example embodiment may access the historical data by accessing a historical internal model, that includes the historical data. In some embodiments, the historical internal model may be published and may be currently employed for use as the map model that may be utilized by a vehicle and/or operator for navigational purposes.

As shown in block 403 of FIG. 4, the apparatus 100 embodied by a computing device, such as map data service provider 201 may include means, such as the processor 102, memory 106 or the like, for generating a modified internal model for the location, such as for a region including the location, based at least in part on the comparison of the received data pertaining to the location and the historical data pertaining to the same location. In some embodiments, the modified internal model may be associated with a time stamp. In some embodiments, the time stamp may be indicative of the time the modified internal model was generated, indicating a time associated with the capture of the one or more attributes used to generate the modified internal model. In some embodiments, the map data service provider 201 may compare the received data pertaining to the location and the historical data pertaining to the same location and determine a discrepancy between the received data and the historical data. In some embodiments, this may cause the map data service provider 201 to generate a modified internal model for the location.

By way of example, if the received data describes an attribute that is not described by the historical data, such as a new object pertaining to the road segment, the map data service provider 201 may determine to generate a modified internal model for the location. As such the generated modified internal model for the location incorporates the new object pertaining to the road segment that was not previously described in the historical data, such that it would not be depicted in the one or more published historical internal models.

As another example, if the received data no longer describes an attribute that is described by the historical data, such as an outdated object no longer present near the road segment, the map data service provider 201 may determine to generate a modified internal model for the location. As such, the generated modified internal model for the location no longer includes the outdated object. In this way, a vehicle and/or operator provided with the newly generated modified internal model would no longer expect to see the outdated object and thereby would provide a more accurate representation of the road segment.

In some embodiments, the map data service provider 201 may generate the modified internal model for the location based upon a determination as to whether the received data pertaining to the location matches the historical data pertaining to the same location. In some embodiments, matching may indicate that each of the one or more attributes described by the received data exactly matches the one or more attributes described by the historical data. For example, if the one or more attributes of the received data describes an attribute not described by the one or more attributes of the historical data, then the map data service provider 201 may determine to generate a modified internal model.

In some embodiments, matching may indicate that the one or more attributes described by the received data is within a predefined percent or amount of the one or more attributes described by the historical data. For example, if one or more attributes of the received data describes an attribute and if the historical data also describes the attribute at the same location, but the attributes are described in a manner that differs by no more than a predefined percent or amount, such as by differing in location by no more than the predefined percent or amount, the computing device, such as the map data service provider 201 and, more particularly, the processor of an example embodiment is configured to determine not to generate a modified internal model. In this way, the map data service provider 201 may be configured to only generate a modified internal model when the received data differs from the historical data by at least a predefined percent or amount, thus saving computational time and storage space.

After generating a modified internal model, as generated in block 403 of FIG. 4, it may be beneficial to increase a confidence score for one or more associated attributes of the modified internal model. In order for a computing device, such as map data service provider 201 to provide accurate representations of road geometries, a confidence score may be assigned to each attribute of the modified internal model. The confidence score of an attribute may be indicative of the level of certainty that the attribute pertains to a road segment. For example, an attribute that is frequently detected by one or more vehicles may be associated with a high confidence score, as the attribute's frequent detection serves as a confirmation that the attribute still pertains to the road segment. This may prevent the inclusion of erroneous attributes in the modified internal model, as erroneous attributes would likely not be associated with repeat detections from one or more vehicles. Once a modified internal model comprises one or more attributes which satisfy a confidence score threshold, this may indicate that the modified internal model is accurate and therefore is ready to be accessed by vehicles and/or operators.

Referring now to block 501 of FIG. 5, the apparatus 100 embodied by a computing device, such as map data service provider 201 may include means, such as the processor 102, memory 106, or the like, for increasing an associated confidence score for each attribute in the modified internal model for each instance that received data from one or more other vehicles also describes the attribute that is represented in the modified internal model (such as in an instance in which the data received from one vehicle was determined not to match the historical data represented by the map model).

By way of example, the map data service provider 201 may receive data from one or more other vehicles also traveling at or near the same location, such as on the same road segment. The additional received data may also describe one or more attributes of the location. The map data service provider 201 may compare each received data instance describing one or more attributes to the one or more attributes described by the generated modified internal model, similarly to the description provided with respect to block 403 in FIG. 4. For each instance that the received data from another vehicle describes an attribute that is included in the modified internal model, the associated confidence score for the attribute in the modified internal model may be increased. In this way, the map data service provider 201 may build an accurate modified internal model including an attribute that has changed in some manner since the collection of the historical data represented by the map model with the modified internal model being validated over time.

In some embodiments, the map data service provider 201 may increase the confidence score of the attribute by a predetermined amount for each instance the additional received data from one or more other vehicles describes the attribute. For example, the confidence score of an attribute may be increased by 5 points or 5% for each instance the additional received data from one or more other vehicles describes the attribute up to a maximum confidence score, e.g., 100%. In some embodiments, the map data service provider 201 may increase the confidence score of the attribute using a sliding scale. For example, the confidence score of an attribute may be increased by a more significant amount, such as by 15 point or 15%, for the first five instances where the additional received data from one or more other vehicles describes the attribute and then may be increased by a less significant amount, such as by 5 points or 5%, onward from the fifth instance when the additional received data from one or more other vehicles describes the attribute up to a maximum confidence score. In this way, the map data service provider 201 may more quickly build a confidence score for one or more attributes of a modified internal model, which may be useful to provide the modified internal model to vehicles and/or operators of vehicles more quickly while also ensuring accuracy.

At block 502 of FIG. 5, the apparatus 100 embodied by a computing device, such as map data service provider 201 may include means, such as the processor 102, memory 106, or the like, for determining whether the modified internal model comprises one or more attributes which satisfy a confidence score threshold. In some embodiments, the one or more attributes of the modified internal model may satisfy a confidence score threshold by each attribute meeting or exceeding a standard predefined confidence score. In some embodiments, the one or more attributes of the modified internal model may satisfy a confidence score threshold by meeting or exceeding a custom predefined confidence score. For example, the confidence score threshold may differ depending on the type of attribute. An attribute pertaining to a traffic signal may require a greater confidence score than an attribute pertaining to a sign advertising nearby amenities. In some embodiments, only a predefined amount or percent of the one or more attributes of the modified internal model may be required to satisfy a confidence score threshold for the entire modified internal model to be considered to have more generally satisfied the confidence score threshold. For example, only 85% of the one or more attributes of the modified internal model may be required to satisfy a confidence score threshold.

In the instance that the modified internal model does not comprise one or more attributes which satisfy a confidence score threshold, the map data service provider 201 may return to block 501. By returning to block 501, the map data service provider 201 may continue to increase the associated confidence score for each attribute in the modified internal model until the modified internal model comprises one or more attributes which satisfy a confidence score threshold.

In the instance that the one or more attributes of the modified internal model satisfy a confidence score threshold, the map data service provider 201 may proceed to block 503. At block 503 of FIG. 5, the apparatus 100 embodied by a computing device, such as map data service provider 201 may include means, such as the processor 102, memory 106, communication interface 104 or the like, for publishing the modified internal model such that it is accessible and/or provided to vehicles and/or operators of vehicles. In some embodiments, the published modified internal model may be associated with a time stamp indicating the time the internal map model was published. In some embodiments, the publishing of the modified internal model may allow the modified internal model to be provided to one or more vehicles and/or operators of vehicles traveling in or about the corresponding location. In some embodiments, the map data service provider 201 may provide the modified internal model to processing server 203 for use in the map database 202. As such, the map database 202 may be updated to include the modified internal model at the location and may therefore facilitate an indication of one or more routes and one or more objects pertaining to the one or more routes, such as to a mobile device 204, such that the modified internal model is now published. In some embodiments, one or more historical internal models may also be published. In some embodiments, the published modified internal model and/or one or more historical internal models may be provided to a computing device onboard a vehicle to assist in the provision of one or more navigational instructions. In some embodiments, the mobile device 204 is a computing device onboard a vehicle, such as the vehicle embodying the map model engine 301, to assist in the provision of one or more navigational instructions. In some embodiments, the mobile device 204 is a computing device onboard a vehicle, such as an ADAS module configured to execute one or more navigational instructions. The modified internal model and/or one or more historical internal models may then be utilized or referenced by a computing device onboard or otherwise associated with the vehicle to provide for improved navigation, such as in the manner described below.

As discussed above, a confidence score of an attribute may be indicative of the level of certainty that the attribute pertains to a road segment. While the confidence score of attributes may be increased, as described in FIG. 5, similarly, the confidence score of attributes may be decreased. Decreasing the confidence score of attributes may be useful in instances when the attribute is no longer relevant and/or pertinent to a road segment. For example, an attribute that is no longer detected by one or more vehicles, for instance because the attribute has been removed from the road segment, may have its associated confidence score decreased. This may allow outdated historical internal models to be unpublished such that they are no longer accessible to vehicles and/or operators. This may also cut down on the number of internal model choices with which a vehicle is presented, thereby saving processing resources and allowing the selection of an internal model to occur more quickly.

Referring now to block 601 of FIG. 6, the apparatus 100 embodied by a computing device, such as map data service provider 201 may include means, such as the processor 102, memory 106, or the like, for decreasing an associated confidence score for each attribute in the one or more historical internal models for each instance that received data from one or more other vehicles does not include, depict or otherwise match the one or more attributes associated with the one or more historical internal models of the same location.

By way of example, the map data service provider 201 may receive data from one or more other vehicles also traveling at or near the same location, such as on the same road segment. The additional received data may also describe one or more attributes of the location. The map data service provider 201 may compare each received data instance describing one or more attributes to the one or more attributes described by historical data, which may be depicted in one or more historical internal models. In some embodiments, a historical internal model may currently be published such that it is employed for use as the map model which may be currently employed by a vehicle and/or operator for navigational purposes. The one or more historical internal models may currently be accessible to vehicles and/or operators of vehicles. For each instance that received data does not depict or otherwise deviates from an attribute associated with the one or more published historical internal models, the confidence score associated with the attribute in each of the one or more historical internal models may be decreased. In this way, the map data service provider 201 may determine attributes and/or historical internal models which may no longer be accurate.

In some embodiments, the map data service provider 201 may decrease the confidence score of the attribute by a predetermined amount for each instance the additional received data from one or more other vehicles does not describe the attribute. For example, the confidence score of an attribute may be decreased by 5 points or 5% for each instance the additional received data from one or more other vehicles does not describe the attribute up to a minimum confidence score, e.g., 0%. In some embodiments, the map data service provider 201 may decrease the confidence score of the attribute using a sliding scale. For example, the confidence score of an attribute may be decreased by a less significant amount, such as by 5 points or 5%, for the first five instances where the additional received data from one or more other vehicles does not describe the attribute and then may be decreased by a more significant amount, such as by 15 points or 15%, onward from the fifth instance when the additional received data from one or more other vehicles does not describe the attribute up to a minimum confidence score. In this way, the map data service provider 201 may build in a tolerance buffer for attributes that may not always appear in received data but may still pertain to the road segment.

At block 602 of FIG. 6, the apparatus 100 embodied by a computing device, such as map data service provider 201 may include means, such as the processor 102, memory 106, or the like, for determining whether a historical internal model of the one or more historical internal models comprises one or more attributes which satisfy a confidence score threshold. In some embodiments, the one or more attributes of the historical internal model may satisfy a confidence score threshold by each attribute meeting or exceeding a standard predefined confidence score. In some embodiments, the one or more attributes of the historical internal model may satisfy a confidence score threshold by meeting or exceeding a custom predefined confidence score. For example, the confidence score may differ depending on the type of attribute. An attribute pertaining to a traffic signal may require a greater confidence score than an attribute pertaining to a sign advertising nearby amenities. In some embodiments, only a predefined amount or percent of the one or more attributes of the historical internal model may be required to satisfy a confidence score threshold. For example, only 85% of the one or more attributes of the historical internal model may be required to satisfy a confidence score threshold.

In the instance that the historical internal model comprises one or more attributes which satisfy a confidence score threshold, the map data service provider 201 may return to block 601. Although one or more attributes of the historical internal model may have decreased, this does not necessarily mean the historical internal model is incorrect, but may only indicate that data received from a vehicle did not capture the one or more attributes of the published historical model. This prevents relevant historical internal models from being erroneously unpublished in the event their associated confidence score decreases.

In the instance that the one or more attributes of the historical internal model does not satisfy a confidence score threshold and the historical internal model is published, the map data service provider 201 may proceed to block 603. At block 603 of FIG. 6, the apparatus 100 embodied by a computing device, such as map data service provider 201 may include means, such as the processor 102, memory 106, communication interface 104 or the like, for unpublishing the published historical internal model such that it is no longer accessible and/or provided to vehicles and/or operators of vehicles. In some embodiments, unpublishing the published historical internal model no longer allows the historical internal model to be provided to one or more vehicles and/or operators of vehicles traveling in the corresponding location. In some embodiments, the map data service provider 201 may provide an indication to processing server 203 to remove the historical internal model from use in the map database 202 in an instance in which the historical internal model is to be unpublished. As such, the map database 202 may be updated such that it no longer includes the historical internal model at the location and may therefore prevent the provision of the historical internal model to vehicles and/or operators of vehicles. This may be beneficial as the historical internal model may be outdated, as indicated by the one or more attributes of the historical internal model no longer satisfying a confidence score threshold.

In some embodiments, the one or more internal models that were unpublished may continue to be stored, such as in a map model database 202. In some embodiments, the one or more internal models that were unpublished and have remained unpublished may be stored for a predefined time period. For example, an internal model that was unpublished may be stored for up to 6 months after unpublishing. After the predefined time period, the internal model that was unpublished may be purged from storage. In some embodiments, if the one or more internal models that were unpublished are published once more, this resets the predefined time period. As such, the computing entity configured to store the one or more internal models may reallocate storage for more relevant internal models.

Referring now to FIG. 7, the operations that are illustrated are performed by a computing apparatus, such as by the apparatus 100 of FIG. 1 embodied by an onboard computing apparatus of a vehicle such as map model engine 301, in accordance with an example embodiment in order to update a map model. In some embodiments, the computing apparatus, such as map model engine 301 may be an offboard computing apparatus, which may be in communication with a vehicle in accordance with an example embodiment in order to update a map model. In some embodiments, the operations that are illustrated are performed by the apparatus 100 of FIG. 1 embodied by a computing apparatus, such as mobile device 204, in accordance with an example embodiment in order to update a map model. However any computing apparatus configured to perform the below described operations may be contemplated for use.

Referring now to block 701 of FIG. 7, the apparatus 100 embodied by an onboard computing apparatus of a vehicle such as map model engine 301, may include means, such as the processor 102, the communication interface 104 or the like, for receiving a map update request. In some embodiments, the map update request may be received from a computing entity, such as map data service provider 201. By way of example, the vehicle is described herein as an autonomous vehicle which may, in turn, be a fully autonomous vehicle or a partly autonomous vehicle. Alternatively, the vehicle need not be autonomous, but may be manually operated. Regardless of the type of vehicle, the apparatus, such as the processor, may detect a discrepancy between the data pertaining to the location as detected by one or more vehicle sensors and the data provided by the map model. In some embodiments, the map update request may specifically request sensor data used by the computing entity, such as map data service provider 201, to update one or more internal maps. In some embodiments, the map update request may be received in part due to the location the vehicle is traveling. For example, if the vehicle is traveling on a road segment undergoing one or more changes, a computing entity, such as the map data service provider 201, may request information pertaining to this area.

Referring now to block 702 of FIG. 7, the apparatus 100 embodied by an onboard computing apparatus of a vehicle such as map model engine 301, may include means, such as the processor 102, the communication interface 104 or the like, for triggering a transmission of data pertaining to a location to a computing device in response to the map update request. In some embodiments, map model engine 301 may receive sensor data from one or more onboard sensors. For example, map model engine 301 may receive one or more images depicting one or more attributes on or adjacent to a road segment. In some embodiments, map model engine 301 may trigger the transmission of sensor data specific to the map update request. For example, if the map update request specifies a request for the road signs on a particular road segment, the map model engine 301 may trigger the transmission of sensor data pertaining to one or more road signs on the particular road segment.

In some embodiments, the transmission of data pertaining to the location may cause a computing device, such as map data service provider 201, to compare the data to historical data pertaining to the same location so as to generate a modified internal model for the location. In some embodiments, the transmission of data may cause the computing entity to perform various operations described above in FIGS. 4-6.

Referring now to block 703 of FIG. 7, the apparatus 100 embodied by an onboard computing apparatus of a vehicle such as map model engine 301, may include means, such as the processor 102, the communication interface 104 or the like, for receiving one or more internal models, including the modified internal model generated by the computing device in block 702, for the location. In some embodiments, the received one or more internal models may comprise one or more internal map models provided by the computing device that executes the mapping software which satisfy a confidence score threshold pertaining to the same location, as described in FIG. 5, such that the one or more internal models are published internal models. In some embodiments, the one or more internal models may assist in the provision of one or more navigational instructions.

The map model engine 301 may now have a choice in selecting a published internal model that best suites the current environment experienced by the vehicle and/or operator of the vehicle. In some embodiments, if the map model engine 301 receives a map update request for an area it is currently traveling in, this may indicate that the current map model for the area is at least a partially outdated map model or does not exist. As such, one or more vehicles traveling on one or more road segments in the area may be unable to localize and/or have limited information pertaining to the area. As such, the provision of one or more internal models may provide the vehicle and/or operator with additional information that may assist in one or more navigational instructions.

The computing device, such as map data service provider 201 may now select a published internal model that most closely resembles the current environment within which the vehicle is operating, as determined by the map data service provider 201. For example, the map data service provider 201 may select the published internal model that most closely resembles the current status of the road segment on which the vehicle is traveling. This may be accomplished by comparing the one or more attributes of the data pertaining to the location to one or more attributes pertaining to the same location in one or more published models. The selected published internal model may be used to assist in the provision of one or more navigational operations for a vehicle and/or operator.

Referring now to block 801 of FIG. 8, the apparatus 100 embodied by a computing device, such as map data service provider 201 may include means, such as the processor 102, communication interface 104, memory 106, or the like, for comparing the data pertaining to a location describing one or more attributes of a location to one or more attributes of one or more published internal models. In this way, the map data service provider 201 may determine the published internal model that most closely depicts the current status of the road segment.

Referring now to block 802 of FIG. 8, the apparatus 100 embodied by a computing device, such as map data service provider 201 may include means, such as the processor 102, communication interface 104, memory 106, or the like, for selecting the internal model from among the one or more published internal models whose one or more attributes most closely match the one or more attributes of the data pertaining to the location, such as the one of more attributes of data recently collected by one or more sensors that are representative of the current state of the environment through which the vehicle is traveling. In some embodiments, the map model currently being used may also be selected by the map data service provider. As such, if none of the published internal models accurately depict the current state of the environment or depict the current state of the environment less accurately than the map model, the map data service provider 201 may select the map model rather than the one or more or more published internal models.

In some embodiments, a map data service provider 201 may select the internal model mostly closely matching all of the one or more attributes pertaining to the location, such as the current location of the vehicle or the location at which data was most recently collected by the one or more sensors. In some embodiments, a map data service provider 201 may compare and match only a select number of attributes pertaining to the location to the attributes depicted in the one or more published internal models. For example, the map data service provider 201 may prioritize certain attributes associated with important indications, such as traffic signaling, over other attribute(s) associated with less important indications, such as an attribute pertaining to a sign advertising nearby amenities. As a result of the matching, the vehicle and/or operator are provided additional information by utilizing the internal model most closely matching the current environment of the vehicle and/or operator.

The computing device of an example embodiment, such as map data service provider 201 may opt to select a published internal model based on the associated time stamp of the one or more published internal models. The map data service provider 201 may opt for this selection process in instances where there are many published internal models such that comparing the data pertaining to the location describing one or more attributes of the location to the one or more attributes of each internal model is determined to be too time consuming. For instance, if a vehicle needs to quickly select an internal model to assist in the provision of one or more navigational instructions, then the map data service provider 201 may choose the internal model with the most recent time stamp. In this way, the map data service provider 201 may select the internal model associated with the more recent capture of one or more attributes.

Referring now to block 901 of FIG. 9, the apparatus 100 embodied by a computing device, such as map data service provider 201 may include means, such as the processor 102, communication interface 104, memory 106, or the like, for determining the internal model with the most recent time stamp. In some embodiments, the map data service provider 201 may prioritize recency of an internal model. As such, the map data service provider 201 may forgo comparing and matching the data pertaining to a location describing one or more attributes of a location to one or more attributes of one or more published internal models and instead, may determine the internal model associated with the most recent time stamp.

Referring now to block 902 of FIG. 9, the apparatus 100 embodied by a computing device, such as map data service provider 201 may include means, such as the processor 102, communication interface 104, memory 106, or the like, for selecting the internal model with the most recent time stamp. In some embodiments, the internal model associated with the most recent time stamp associated with publishing of the internal model is selected. In other embodiments, the internal model associated with the most recent time stamp associated with generation of the internal model is selected. The internal model with the most recent time stamp may provide the most recent internal model published to the map model and may therefore represent the most current attribute data of the area.

The provision of multiple internal models within a map model pertaining to the same location may be beneficial to a vehicle and/or operator by allowing selection of the internal model most closely matching the current attribute data of the road segment. The one or more internal models may represent road segments at different time periods, such that a vehicle and/or operators of a vehicle may be presented with one or more internal map models for the location and may choose the internal model that most closely matches the current state of the road segment. In this way, while each of the one or more internal models may not be complete, the internal models may present the vehicle and/or operator with information not previously depicted in the traditional map model and may allow the vehicle and/or operator to choose an internal model to use, at least within a region undergoing construction or other changes, such that the vehicle and/or operator is not forced to operate without a map or with an outdated map.

FIGS. 4-9 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 206 of an apparatus 200 employing an embodiment of the present invention and executed by the at least one processor 202. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for updating a map model, the method comprising:
    transmitting a map update request to a computing device onboard a vehicle, wherein the map update request comprises a request for data associated with one or more specified attributes of a location, wherein the one or more specified attributes of the location specify at least one attribute in addition to location information of the location;
    receiving data pertaining to the location, responsive to the map update request, from the computing device onboard the vehicle, wherein the data comprises data collected by one or more sensors onboard the vehicle and describes the one or more specified attributes of the location;
    comparing the received data pertaining to the location to historical data pertaining to the same location, wherein the historical data describes one or more attributes of the location, and wherein the historical data is used in one or more historical internal models;

generating, via a map service provider database, a modified internal model for the location based at least in part upon a comparison of the received data pertaining to the location and the historical data pertaining to the same location; and publishing, via a map service provider database, the modified internal model such that the modified internal model is accessible to a computing device onboard the vehicle only in an instance in which (i) one or more attributes of the modified internal model comprise a confidence score that satisfies a threshold and (ii) the modified internal model differs from the historical data pertaining to the same location by at least a predefined percent or amount, wherein the confidence score of an attribute of the one or more attributes is adjusted using a sliding scale where, for a first number of instances that the attribute in the received data matches a same attribute in the historical data, the confidence score of the attribute is increased by a first value and, for a second number of instances that the attribute in the received data matches the same attribute in the historical data, the confidence score of the attribute is increased by a second value, less than the first value, and wherein the map service provider database utilizes a mapping software to generate and update one or more internal models.

2. A method according to claim 1,
wherein the modified internal model comprises one or more attributes described by the received data; and
wherein the method further comprises increasing an associated confidence score for each attribute in the modified internal model for each instance that received data from one or more other vehicles also describes the attribute.

3. A method according to claim 1, further comprising causing the modified internal model to be provided to a computing device onboard the vehicle to assist in provision of one or more navigational instructions.

4. A method according to claim 1,
wherein one or more historical internal models comprise one or more attributes described by the historical data and wherein the one or more historical internal models are published such that the one or more published historical internal models are accessible to a computing device onboard the vehicle; and
wherein the method further comprises decreasing an associated confidence score for each attribute in the one or more historical internal models for each instance that received data from one or more vehicles does not depict the attribute associated with the one or more historical internal models.

5. The method according to claim 4, wherein in an instance the one or more attributes associated with the one or more published historical internal models does not satisfy a confidence score threshold, unpublishing the one or more historical internal models such that the one or more historical internal models are no longer accessible to a computing device onboard the vehicle.

6. The method of claim 1, wherein the one or more historical internal models and the updated internal model are associated with a time stamp indicating a time associated with capture of the one or more attributes.

7. A method for updating a map model, the method comprising:
receiving, via an onboard computing device, from a map data computing device, a map update request comprising a request for data associated with one or more specified attributes of a location, wherein the one or more specified attributes of the location specify at least one attribute in addition to location information of the location, wherein the onboard computing device comprises an object database configured to identify a plurality of objects throughout a road network and identify one or more of a location of an object, a type of the object, or information indicating an appearance of the object for respective ones of the plurality of objects;
triggering in response to the map update request, via the onboard computing device, a transmission of data pertaining to the location to the map data computing device to be compared to historical data pertaining to the same location so as to generate a modified internal model for the location, wherein the data comprises data collected by one or more sensors onboard the vehicle and describes the one or more specified attributes of the location, and wherein the one or more sensors comprise at least one of: a global positioning system (GPS), one or more accelerometers, one or more image sensors, one or more light distancing and ranging (LiDAR) sensors, one or more gyroscopes, or one or more radars;
causing the map data computing device to compare the data pertaining to the location to historical data pertaining to a same location to generate a modified internal model for the location; and
receiving, from the map data computing device, one or more internal models for the location including the modified internal model generated by the map data computing device pertaining to the same location, wherein the onboard computing device is enabled to select between the modified internal model and previously stored historical internal models based on which of the modified internal model and previously stored historical internal models more closely matches a current state of the location, and wherein the one or more internal models assist in provision of one or more navigational instructions.

8. A method according to claim 7, wherein the one or more internal models satisfy a confidence score threshold.

9. The method of claim 8, further comprising:
comparing the data pertaining to the location describing one or more attributes of the location to one or more attributes of one or more internal models; and
selecting the internal model whose one or more attributes most closely match the one or more attributes of the data pertaining to the location, wherein the selected internal model assists in provision of one or more navigational instructions.

10. The method of claim 7, wherein one or more historical internal models and the internal model are associated with a time stamp indicating a time associated with capture of the one or more attributes.

11. The method of claim 10, further comprising selecting the internal model based upon the time stamps of the one or more historical internal models and the modified internal model, wherein the selected internal model assists in provision of one or more navigational instructions.

12. An apparatus comprising:
at least one processor; and
at least one memory including computer program code, the at least one memory and the computer program code configured to, with the at least one processor, cause the apparatus at least to:

transmit a map update request to a computing device onboard a vehicle, wherein the map update request comprises a request for data associated with one or more specified attributes of a location, wherein the one or more specified attributes of the location specify at least one attribute in addition to location information of the location;

receive data pertaining to the location, responsive to the map update request, from the computing device onboard the vehicle, wherein the data comprises data collected by one or more sensors onboard the vehicle and describes the one or more specified attributes of the location;

compare the received data pertaining to the location to historical data pertaining to the same location, wherein the historical data describes one or more attributes of the location, and wherein the historical data is used in one or more historical internal models;

generate, via a map service provider database, a modified internal model for the location based at least in part upon a comparison of the received data pertaining to the location and the historical data pertaining to the same location; and publish, via a map service provider database, the modified internal model such that the modified internal model is accessible to a computing device onboard the vehicle only in an instance in which (i) one or more attributes of the modified internal model comprises a confidence score that satisfies a threshold and (ii) the modified internal model differs from the historical data pertaining to the same location by at least a predefined percent or amount, wherein the confidence score of an attribute of the one or more attributes is adjusted using a sliding scale where, for a first number of instances that the attribute in the received data matches a same attribute in the historical data, the confidence score of the attribute is increased by a first value and, for a second number of instances that the attribute in the received data matches the same attribute in the historical data, the confidence score of the attribute is increased by a second value, less than the first value, and wherein the map service provider database utilizes a mapping software to generate and update one or more internal models.

13. An apparatus according to claim 12,
wherein the modified internal model comprises one or more attributes described by the received data; and
wherein the at least one memory and the computer program code are further configured to, with the at least one processor, cause the apparatus to increase an associated confidence score for each attribute in the modified internal model for each instance that received data from one or more other vehicles also describes the attribute.

14. An apparatus according to claim 12, wherein the at least one memory and the computer program code are further configured to, with the at least one processor, cause the apparatus at least to cause the modified internal model to be provided to a computing device onboard the vehicle to assist in provision of one or more navigational instructions.

15. An apparatus according to claim 12,
wherein one or more historical internal models comprise one or more attributes described by the historical data and wherein the one or more historical internal models are published such that the one or more published historical internal models are accessible to a computing device onboard the vehicle; and
wherein the at least one memory and the computer program code are further configured to, with the at least one processor, cause the apparatus at least to decrease an associated confidence score for each attribute in the one or more historical internal models for each instance that received data from one or more vehicles does not depict the attribute associated with the one or more historical internal models.

16. The apparatus according to claim 15, wherein the at least one memory and the computer program code are further configured to, with the at least one processor, cause the apparatus at least to, in an instance the one or more attributes associated with the one or more published historical internal models does not satisfy a confidence score threshold, unpublish the one or more historical internal models such that the one or more historical internal models are no longer accessible to a computing device onboard the vehicle.

17. The apparatus according to claim 12, wherein the one or more historical internal models and the updated internal model are associated with a time stamp indicating a time associated with capture of the one or more attributes.

18. A method according to claim 1, wherein the one or more specified attributes of the location comprise at least one of: one or more road segment geometries, one or more road signs, one or more directional arrows, or one or more traffic lights.

19. A method according to claim 7, wherein the one or more specified attributes of the location comprise at least one of: one or more road segment geometries, one or more road signs, one or more directional arrows, or one or more traffic lights.

20. An apparatus according to claim 12, wherein the one or more specified attributes of the location comprise at least one of: one or more road segment geometries, one or more road signs, one or more directional arrows, or one or more traffic lights.

* * * * *